(12) United States Patent
Kei et al.

(10) Patent No.: US 12,352,942 B2
(45) Date of Patent: Jul. 8, 2025

(54) CONFOCAL SCANNER AND CONFOCAL MICROSCOPE

(71) Applicant: Yokogawa Electric Corporation, Musashino (JP)

(72) Inventors: Takayuki Kei, Musashino (JP); Naoki Andoh, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 654 days.

(21) Appl. No.: 17/592,654

(22) Filed: Feb. 4, 2022

(65) Prior Publication Data
US 2022/0291494 A1 Sep. 15, 2022

(30) Foreign Application Priority Data
Mar. 15, 2021 (JP) ................. 2021-041637

(51) Int. Cl.
*G02B 21/00* (2006.01)
*G02B 27/14* (2006.01)
*G02B 27/28* (2006.01)
*G02B 27/30* (2006.01)

(52) U.S. Cl.
CPC ..... *G02B 21/0044* (2013.01); *G02B 21/0032* (2013.01); *G02B 21/0068* (2013.01); *G02B 27/141* (2013.01); *G02B 27/283* (2013.01); *G02B 27/30* (2013.01)

(58) Field of Classification Search
CPC ............. G02B 21/00; G02B 21/0004; G02B 21/0016; G02B 21/002; G02B 21/0024; G02B 21/0028; G02B 21/0032; G02B 21/0036; G02B 21/0044; G02B 21/0052; G02B 21/0068; G02B 21/06; G02B 21/084; G02B 21/18
USPC .................................. 359/368–398
See application file for complete search history.

(56) References Cited

U.S. PATENT DOCUMENTS

| | | | | |
|---|---|---|---|---|
| 5,000,570 A | * | 3/1991 | Neilson | H04N 1/482 348/270 |
| 5,428,475 A | | 6/1995 | Tanaami et al. | |
| 5,969,846 A | * | 10/1999 | Kishi | G02B 21/0064 359/227 |
| 6,934,079 B2 | * | 8/2005 | Hell | G02B 21/0044 359/368 |

(Continued)

FOREIGN PATENT DOCUMENTS

| | | |
|---|---|---|
| JP | 2663780 B2 | 10/1997 |
| JP | 2019-174586 A | 10/2019 |

*Primary Examiner* — Thong Q Nguyen
(74) *Attorney, Agent, or Firm* — WHDA, LLP

(57) ABSTRACT

A confocal scanner includes a first disk which comprises a plurality of microlenses, a second disk which comprises a plurality of pinholes formed to be associated with the microlenses, wherein the second disk rotates together with the first disk, a light guider which guides a plurality of rays of split light split by the microlenses within the first region set in the first disk to a second region set in the first disk, and a beam splitter which is disposed between the one surface of the first disk and the another surface of the second disk, wherein light which has passed through the microlenses within the second region transmits through the beam splitter, and the beam splitter reflects light incident from the second disk toward an outward side of the first disk and the second disk in a radial direction.

20 Claims, 6 Drawing Sheets

(56) References Cited

U.S. PATENT DOCUMENTS

| | | | |
|---|---|---|---|
| 9,612,428 B2* | 4/2017 | Palo | G02B 21/0044 |
| 10,352,860 B2* | 7/2019 | Kanarowski | G02B 21/008 |
| 2016/0161728 A1* | 6/2016 | Sangu | G02B 27/58 |
| | | | 359/203.1 |
| 2021/0109335 A1 | 4/2021 | Kei | |

* cited by examiner

CONFOCAL SCANNER AND CONFOCAL MICROSCOPE

BACKGROUND

Field of the Invention

The present invention relates to a confocal scanner and a confocal microscope.

Priority is claimed on Japanese Patent Application No. 2021-041637, filed on Mar. 15, 2021, the contents of which are incorporated herein by reference.

Description of Related Art

In the related art, a confocal microscope using a disk scanning-type confocal scanner has been developed. In this confocal microscope, a confocal scanner including a microlens array disk which has a plurality of microlenses formed in a predetermined pattern and a pinhole array disk which has a plurality of pinholes associated with the respective microlenses and formed in the same pattern as the microlenses and is constituted to be able to rotate together with the microlens array disk is used.

In such a confocal microscope, a confocal image of a sample can be obtained by rotating disks (a microlens array disk and a pinhole array disk) provided in a confocal scanner and changing an irradiation position of laser light with respect to the sample (scanning a sample with laser light). Japanese Patent No. 2663780 discloses a confocal microscope in the related art using a disk scanning-type confocal scanner. In addition, Japanese Unexamined Patent Application Publication No. 2019-174586 discloses a homogenizer that uniformizes a distribution of intensities of illumination light in order to obtain an image having a uniform brightness in a confocal microscope.

The homogenizer disclosed in Japanese Unexamined Patent Application Publication No. 2019-174586 includes a disk having microlenses and a driver for rotatably driving the disk and uniformizes a distribution of intensities of illumination light by causing light to be transmitted through the rotated disk. For example, it is conceivable that a confocal image having a uniform brightness and high image quality be able to be obtained by mounting such a homogenizer disclosed in Japanese Unexamined Patent Application Publication No. 2019-174586 in the confocal microscope disclosed in Japanese Patent No. 2663780. However, for example, if the homogenizer disclosed in Japanese Unexamined Patent Application Publication No. 2019-174586 is mounted in the confocal microscope disclosed in Japanese Patent No. 2663780, there is a problem that the confocal microscope is increased in size and costs rise.

SUMMARY

A confocal scanner may include: a first disk which comprises a plurality of microlenses; a second disk which comprises a plurality of pinholes formed to be associated with the microlenses, wherein one surface of the first disk faces another surface of the second disk, and the second disk rotates together with the first disk; a light guider which forms a Koehler illumination system together with the microlenses within a first region set in the first disk, wherein the light guider guides a plurality of rays of split light split by the microlenses within the first region to a second region set in the first disk; and a beam splitter which is disposed between the one surface of the first disk and the another surface of the second disk, wherein light which has passed through the microlenses within the second region transmits through the beam splitter, and the beam splitter reflects light incident from the second disk toward an outward side of the first disk and the second disk in a radial direction.

Further features and aspects of the present disclosure will become apparent from the following detailed description of exemplary embodiments with reference to the attached drawings.

DETAILED DESCRIPTION OF THE INVENTION

Figure 1:
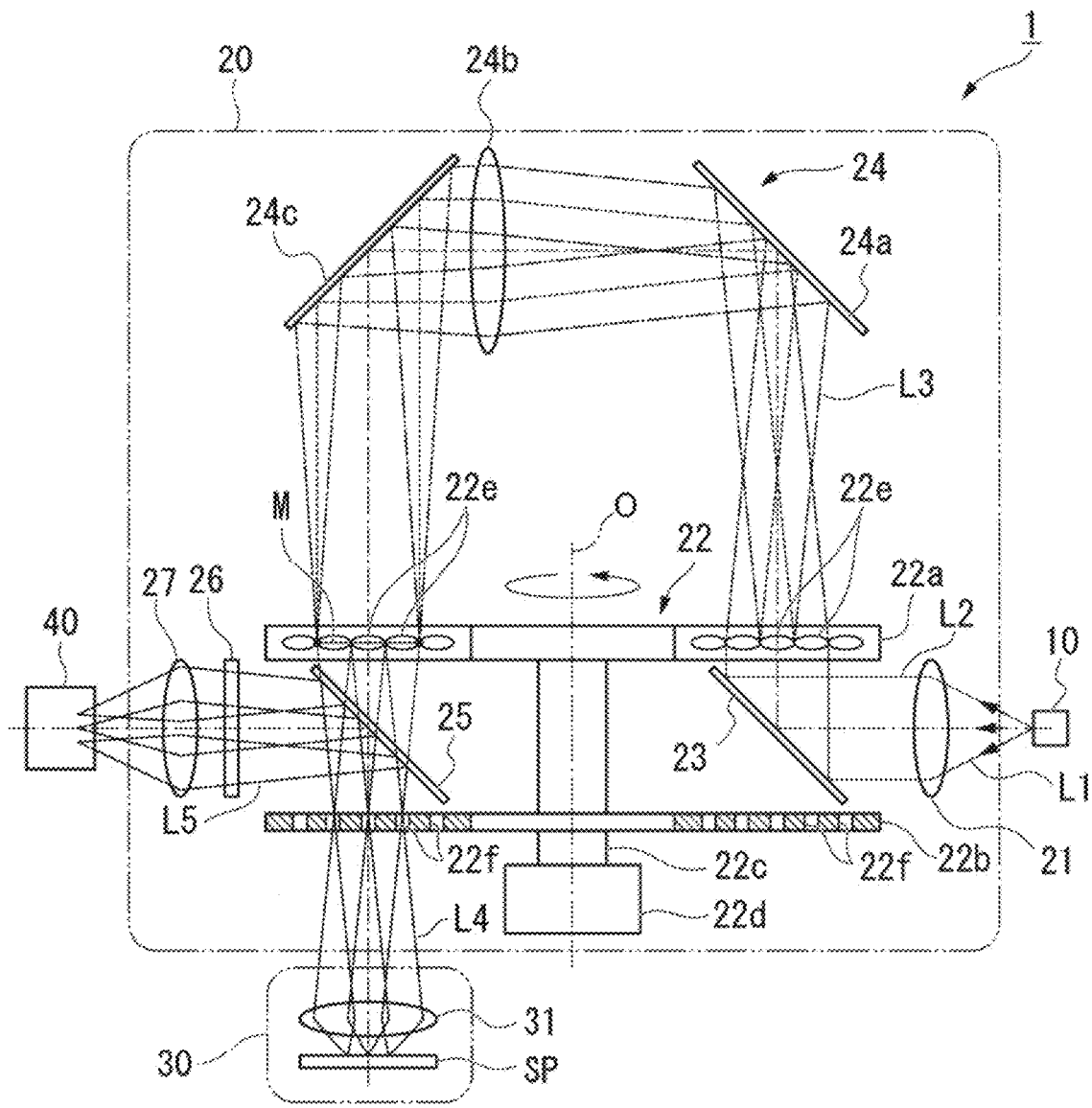
FIG. 1 is a view illustrating a constitution of a main part of a confocal microscope according to a first embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a confocal scanner and a confocal microscope in which increase in device size and cost rise can be curbed and a confocal image having a uniform brightness and high image quality can be obtained.

Hereinafter, a confocal scanner and a confocal microscope according to embodiments of the present invention will be described in detail with reference to the drawings. Hereinafter, first, an overview of the embodiments of the present invention will be described. Subsequently, details of each of the embodiments of the present invention will be described.

[Overview]

The embodiments of the present invention provide a confocal scanner and a confocal microscope in which increase in device size and cost rise can be curbed and a confocal image having a uniform brightness and high image quality can be obtained. Here, the confocal microscope can be applied to a product such as a drug development support device utilizing a confocal laser microscopic method. In the foregoing product, for example, a laser light source which can be regarded as a point light source is expanded with a collimating lens or the like such that it becomes a two-dimensional surface light source. Further, the sample is excited by irradiating a sample such as a cell with the surface light source via an optical system of the confocal scanner. The cell has been fused with a fluorescent material in advance so that the cell emits fluorescence when excitation light is received. This fluorescence is imaged as an image using a microscopic optical system, and observation of the cell or analysis of behavior of the cell is performed. Such a confocal microscope is utilized in the fields of basic research on living beings to application/development of drug discovery.

When a cell image is imaged, in order to obtain high image quality with no blur, a confocal method is utilized in the optical system. In addition, in order to uniformize a brightness of an image throughout the entire surface, it is preferable to use a homogenizer which uniformizes an intensity of illumination light (excitation light) throughout the entire surface. The embodiments of the present invention include two technologies, such as a technology for a confocal scanner realizing a confocal microscopic method and a technology for a homogenizer uniformizing illumination light.

Each of the technology for a confocal scanner realizing a confocal microscopic method and the technology for a homogenizer uniformizing illumination light will be described.

Japanese Patent No. 2663780 presents a representative constitution of a confocal scanner. Signal light on only a focal surface observed using a microscope in a pinhole disk in which a plurality of pinholes are provided in an array shape is allowed to pass through, and noise light from areas other than the focal surface is blocked. In addition, a confocal image is realized through these pinholes. In order to enhance efficiency of utilization of illumination light, a light condensing disk in which a plurality of microlenses are provided in an array shape is used. There is a one-to-one positional relationship between each of the pinholes on the pinhole disk and one of the microlenses on the light condensing disk.

A disk unit is formed by the light condensing disk, the pinhole disk, and a drum (coupling shaft) which couples these to each other. The disk unit is attached to a motor and is rotatably driven. A confocal optical scanner is constituted of this disk unit and a beam splitter. When the disk unit is rotated by means of the motor, the function of the confocal scanner is realized.

Japanese Unexamined Patent Application Publication No. 2019-174586 presents an example of a homogenizer for uniformizing illumination light. Generally, a homogenizer is required to have two functions. When light emitted from a light source is laser light, a function of eliminating non-uniformity due to interference by disrupting coherency of a laser, and a uniformizing function of converting laser light of which optical intensities within a two-dimensional plane manifest a Gaussian distribution into that having a top hat-type distribution are required. In Japanese Unexamined Patent Application Publication No. 2019-174586, the coherency can be disrupted by rotating a microlens array at a high speed. In addition, a Koehler illumination system is utilized for uniformizing. Specifically, uniformity of illumination is realized by a Koehler illumination system formed by each of the microlenses and Fourier lens.

In order to realize a confocal scanner having uniformized illumination light, for example, a method of joining the devices in Japanese Patent No. 2663780 and Japanese Unexamined Patent Application Publication No. 2019-174586 in series with a predetermined positional relationship is considered. Due to such a constitution, a confocal scanner in which expected illumination is uniformized can be obtained. However, the size of the constitution of the equipment becomes large, and costs also rise. Regarding a specific constitution, many expensive precision components such as two microlens array disks (the light condensing disk in Japanese Patent No. 2663780 and the microlens array in Japanese Unexamined Patent Application Publication No. 2019-174586), one pinhole array disk (the pinhole disk in Japanese Patent No. 2663780), and two motors (the motor for rotating the light condensing disk and the pinhole disk in Japanese Patent No. 2663780 and the motor for rotating the microlens array in Japanese Unexamined Patent Application Publication No. 2019-174586) are required.

The confocal scanner according to the embodiment of the present invention includes a first disk which has a plurality of microlenses and is rotated. In addition, the confocal scanner includes a second disk. The second disk has a plurality of pinholes formed to be associated with the microlenses. In addition, the second disk is disposed so as to face the first disk and is rotated together with the first disk.

In addition, the confocal scanner according to the embodiment of the present invention includes a light guider. The light guider forms the Koehler illumination system in which the first disk serves as an irradiation surface together with the microlenses. In addition, the light guider guides split light formed from parallel light which has been split into a plurality of light fluxes through the microlenses to the irradiation surface.

Moreover, the confocal scanner according to the embodiment of the present invention includes a beam splitter. The beam splitter is disposed between the first disk and the second disk. In addition, the beam splitter allows light with which the first disk is irradiated via the light guider and which has passed through the microlenses to be transmitted therethrough. In addition, the beam splitter reflects light incident from the second disk side toward an outward side of the first disk and the second disk in a radial direction.

In such a confocal scanner according to the embodiment of the present invention, the Koehler illumination system is formed by the microlenses of the first disk and the light guider. Namely, in the confocal scanner according to the embodiment of the present invention, the first disk and a driver which rotates the first disk serve as both constituent elements for the confocal scanner generating illumination light and constituent elements for the homogenizer uniformizing a distribution of intensities of illumination light. For this reason, according to the confocal scanner of the embodiment of the present invention, there is no need to separately provide all the constituent elements for the homogenizer.

Therefore, according to the confocal scanner of the embodiment of the present invention, while increase in device size and cost rise are curbed, a distribution of intensities of light emitted from the confocal scanner can be uniformized. As a result, according to the confocal scanner of the embodiment of the present invention, a sample can be irradiated with illumination light having a uniform distribution of intensities, and a confocal image having a homogeneous brightness with no unevenness and high image quality can be obtained.

First Embodiment

<Constitution of Main Part of Confocal Microscope>

FIG. 1 is a view illustrating a constitution of a main part of a confocal microscope according to a first embodiment of the present invention. As illustrated in FIG. 1, a confocal microscope 1 of the present embodiment includes a light source 10, a confocal scanner 20, a microscope 30, and a camera 40 (imaging device). Such a confocal microscope 1 generates illumination light (excitation light) for scanning a sample SP using the confocal scanner 20 from light L1 output from the light source 10 and obtains a confocal image of the sample SP irradiated with illumination light using the camera 40.

The light source 10 outputs the light L1 required for illumination of the sample SP toward the confocal scanner 20. The light L1 output from the light source 10 may be coherent light (laser light) or may be incoherent light. In the present embodiment, in order to facilitate understanding, it is assumed that light output from the light source 10 is laser light. The light source 10 outputs the light L1 having a wavelength range of 400 to 800 [nm], for example. The wavelength range of the light L1 output from the light source 10 is not limited to the foregoing wavelength range (400 to 800 [nm]) and can be an arbitrary wavelength range corresponding to optical characteristics of the sample SP.

The confocal scanner 20 generates illumination light L4 for scanning the sample SP from the light L1 output from the light source 10 and guides reflected light, fluorescence, or the like (which will hereinafter be simply referred to as "return light" when generically referred to) obtained by irradiating the sample SP with illumination light to the camera 40. The confocal scanner 20 includes a collimating lens 21, a disk unit 22, a reflection mirror 23, a split light relay optical system 24 (light guider), a dichroic mirror 25 (beam splitter), an optical filter 26, and a relay lens 27.

The collimating lens 21 converts the light L1 emitted from the light source 10 into parallel light L2. As illustrated in FIG. 1, the collimating lens 21 is disposed on an outward side of a microlens array disk 22a and a pinhole array disk 22b in a radial direction such that an optical axis passes through an area between the microlens array disk 22a and the pinhole array disk 22b (which will be described below). In the present embodiment, the light L1 is emitted at a certain spread angle from the light source 10, and the light L1 is converted into the parallel light L2 by the collimating lens 21. However, when parallel light is emitted from the light source 10, the collimating lens 21 can be omitted.

The disk unit 22 generates the illumination light L4 for scanning the sample SP from the parallel light L2 converted by the collimating lens 21. The disk unit 22 includes the microlens array disk 22a (first disk), the pinhole array disk 22b (second disk), a rotation shaft 22c (coupling shaft), a motor 22d (driver), and the like.

The microlens array disk 22a is a disk having a circular plate shape having a plurality of microlenses 22e disposed in a predetermined pattern (for example, spirally disposed at equal pitch). In addition, the microlens array disk 22a is rotated in a circumferential direction centering on an axis core O illustrated in FIG. 1. The pinhole array disk 22b is a disk having a circular plate shape having a plurality of pinholes 22f formed to be associated with the microlenses 22e of the microlens array disk 22a. The microlens array disk 22a and the pinhole array disk 22b are individually connected to the rotation shaft 22c and are disposed so as to face each other with a certain gap therebetween. In addition, the pinhole array disk 22b is rotated in the circumferential direction centering on the axis core O illustrated in FIG. 1 together with the microlens array disk 22a.

The rotation shaft 22c is a shaft member to which the microlens array disk 22a and the pinhole array disk 22b are individually fixed and connects the microlens array disk 22a and the pinhole array disk 22b to each other. A central part of the microlens array disk 22a is fixed to a tip of the rotation shaft 22c. In addition, the pinhole array disk 22b is fixed to an intermediate part of the rotation shaft 22c. In addition, the motor 22d is connected to a root of the rotation shaft 22c.

The motor 22d is connected to the rotation shaft 22c and generates motive power for rotating the rotation shaft 22c centering on the axis core O. The motor 22d rotatably drives the microlens array disk 22a and the pinhole array disk 22b in the circumferential direction centering on the rotation shaft 22c by rotating the rotation shaft 22c. Namely, when the rotation shaft 22c is rotatably driven by the motor 22d, the microlens array disk 22a and the pinhole array disk 22b can integrally rotate around the rotation shaft 22c. In the present embodiment, as illustrated in FIG. 1, the motor 22d is disposed on a side of the pinhole array disk 22b opposite to the microlens array disk 22a. However, the motor 22d may be disposed on a side of the microlens array disk 22a opposite to the pinhole array disk 22b.

The reflection mirror 23 is disposed at a position between the microlens array disk 22a and the pinhole array disk 22b and overlapping the optical axis of the collimating lens 21. The reflection mirror 23 reflects the parallel light L2, which is emitted from the collimating lens 21 and is incident between the microlens array disk 22a and the pinhole array disk 22b from the outward side thereof in the radial direction, toward the microlens array disk 22a. The reflection mirror 23 reflects the parallel light L2 in a manner parallel to the axis core O of the rotation shaft 22c and guides the parallel light L2 to a surface of the microlens array disk 22a on the pinhole array disk 22b side.

The parallel light L2 guided to the microlens array disk 22a by the reflection mirror 23 is converted into split light L3 which is split into a plurality of light fluxes by the microlenses 22e. Namely, in the present embodiment, as illustrated in FIG. 1, the parallel light L2 is incident on the surface of the microlens array disk 22a on the pinhole array disk 22b side, and the split light L3 is emitted from a surface of the microlens array disk 22a on a side opposite to the pinhole array disk 22b.

The split light relay optical system 24 is an optical system forming a Koehler illumination system in which the microlens array disk 22a serves as an irradiation surface together with the microlenses 22e of the microlens array disk 22a. The split light relay optical system 24 includes a reflection mirror 24a, a Fourier lens 24b, and a reflection mirror 24c.

The reflection mirror 24a is a mirror member on which the split light L3 emitted along the axis core O from the microlens array disk 22a is incident. The reflection mirror 24a is a mirror member reflecting the split light L3 such that the optical axis is orthogonal to the axis core O and is directed toward the axis core O. As illustrated in FIG. 1, the reflection mirror 24a is disposed on a side of the microlens array disk 22a opposite to the pinhole array disk 22b.

The Fourier lens 24b is a lens on which the split light L3 reflected by the reflection mirror 24a is incident. As described above, the split light L3 is light which is realized when the parallel light L2 is split into a plurality of light fluxes by the microlens array disk 22a. The Fourier lens 24b condenses and spatially superimposes the plurality of light fluxes on an irradiation surface M provided in the microlens array disk 22a. Namely, the Fourier lens 24b is disposed on an optical path of the split light L3 and forms the Koehler illumination system together with the microlenses 22e of the microlens array disk 22a.

The reflection mirror 24c is a mirror member on which the split light L3 emitted from the Fourier lens 24b is incident. The reflection mirror 24c reflects the split light L3 emitted from the Fourier lens 24b in a direction orthogonal to the axis core O such that it is directed toward the microlens array disk 22a. The reflection mirror 24c is disposed with the axis core O interposed therebetween.

The reflection mirror 24a and the reflection mirror 24c guide the split light L3 emitted from the microlens array disk 22a to a side opposite to the pinhole array disk 22b to the surface of the microlens array disk 22a on a side opposite to the pinhole array disk 22b. Namely, a split light guider which guides the split light L3 to the surface of the microlens array disk 22a on a side opposite to the pinhole array disk 22b is formed by the reflection mirror 24a and the reflection mirror 24c.

Figure 2:
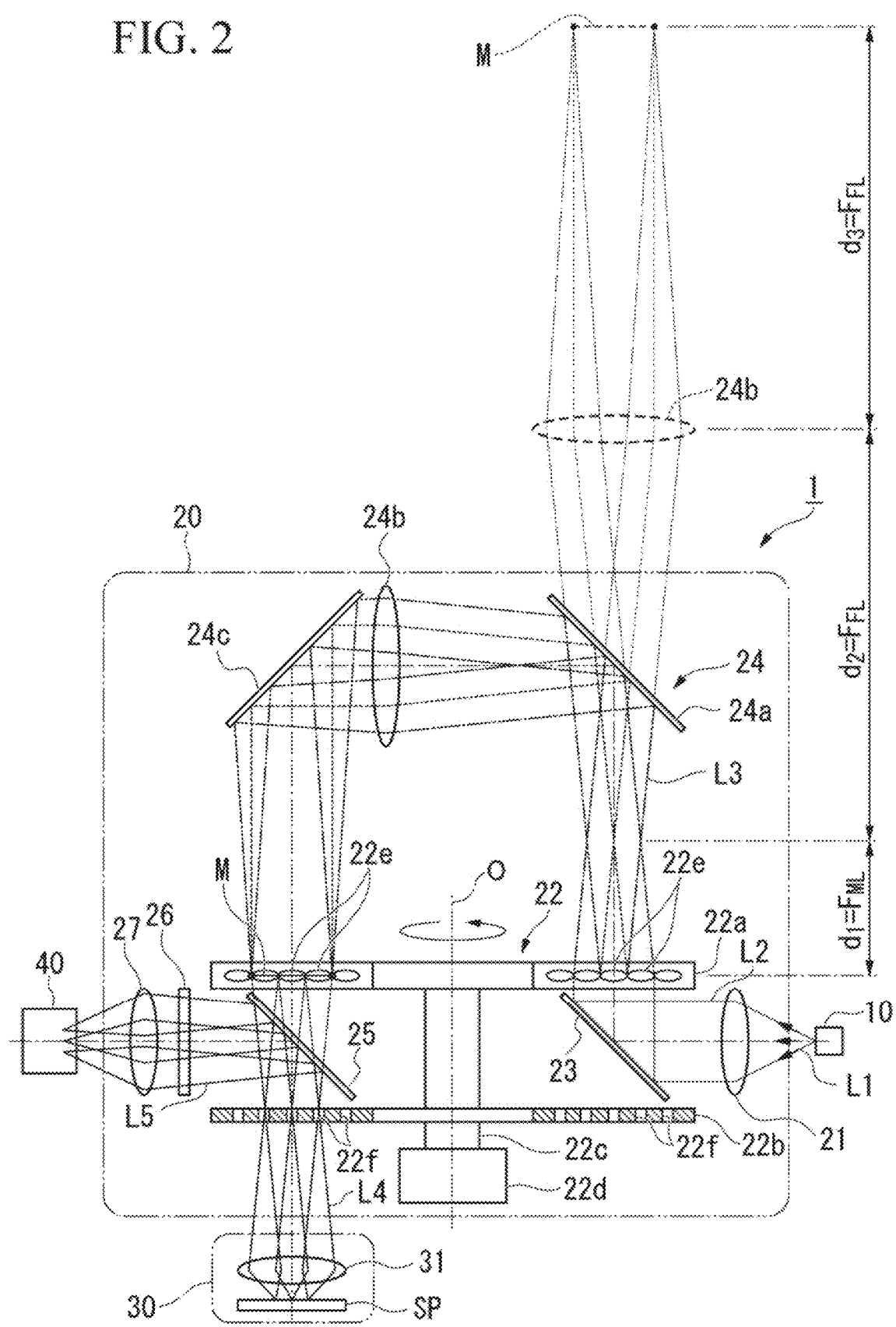
FIG. 2 is a schematic view illustrating an optical path when split light is linearly guided without installing reflection mirrors in FIG. 1.

FIG. 2 is a schematic view illustrating an optical path when the split light L3 is linearly guided without installing the reflection mirror 24a and the reflection mirror 24c in FIG. 1. In the confocal scanner 20 of the present embodiment, the microlenses 22e and the Fourier lens 24b are disposed in the Koehler illumination system in which a surface including a main point of the plurality of microlenses 22e serves as the irradiation surface M. Specifically, a rear side focal surface of the microlenses 22e and a front side focal surface of the Fourier lens 24b are disposed so as to coincide with each other. For example, when a distance (focal distance) $f_{ML}$ from the main point of the microlenses 22e to the rear focal surface is a distance $d_1$, and a distance (focal distance) $f_{FL}$ from the main point of the Fourier lens 24b to the front focal surface is a distance $d_2$, a distance from the main point of the microlenses 22e to the main point of the Fourier lens 24b becomes $d_1+d_2$. In addition, when the distance (focal distance) $f_{FL}$ from the main point of the Fourier lens 24b to the rear focal surface is a distance $d_3$, a distance from the main point of the microlenses 22e to the irradiation surface M becomes $d_1+d_2+d_3$.

Namely, in the confocal scanner 20 of the present embodiment, an optical path length of the split light L3 from the main point of the microlenses 22e through which the split light L3 is emitted to the irradiation surface M becomes $d_1+d_2+d_3$. Therefore, the optical path length of the split light L3 formed by the split light relay optical system 24 also becomes $d_1+d_2+d_3$.

In such a Koehler illumination system formed by the microlenses 22e and the Fourier lens 24b, the parallel light L2 is split into a plurality of light fluxes by the microlenses 22e so that it is converted into the split light L3. Each of the light fluxes of the split light L3 is converged at a focal point of each of the microlenses 22e, expands again thereafter, is reflected by the reflection mirror 24a, and is directed toward the Fourier lens 24b. Each of the light fluxes which has passed through the Fourier lens 24b becomes a parallel beam again and is reflected by the reflection mirror 24c, and a focal surface of the Fourier lens 24b (that is, the irradiation surface M) is irradiated therewith in a superimposed manner.

When each of the light fluxes is superimposed on the irradiation surface M, the split light L3 becomes the illumination light L4 having a uniform distribution of intensities. The plurality of microlenses 22e split the illumination light L4 into a plurality of light fluxes. Each of the light fluxes is transmitted through the dichroic mirror 25 and becomes a spot at a focal point position of each of the microlenses 22e. The pinhole array disk 22b is disposed at a position on the focal surface of the microlenses 22e, and each of the light fluxes passes through the pinholes 22f associated with the microlenses 22e.

Figure 3:
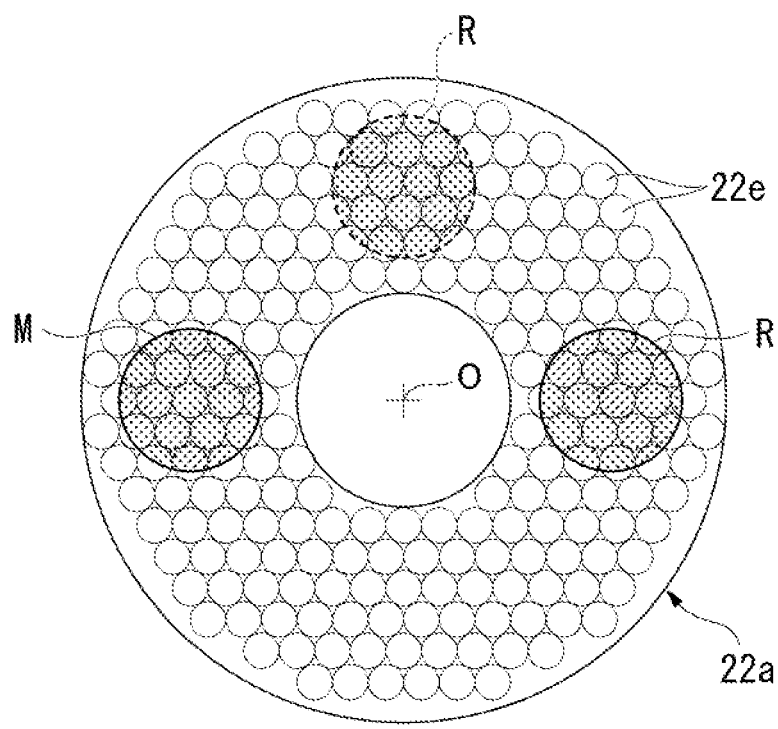
FIG. 3 is a schematic front view of a microlens array disk according to the first embodiment of the present invention.

FIG. 3 is a schematic front view of the microlens array disk 22a. As illustrated in FIG. 3, a part R where the parallel light L2 emitted from the collimating lens 21 and reflected by the reflection mirror 23 becomes the split light L3 (that is, a part used for Koehler illumination) and the irradiation surface M (a part used for confocal scanning) are provided at different parts in the microlens array disk 22a. The reflection mirror 24a and the reflection mirror 24c of the present embodiment are disposed with the axis core O interposed therebetween when viewed in a direction along the axis core O. Namely, the part R where the parallel light L2 becomes the split light L3 and the irradiation surface M are provided with the axis core O interposed therebetween. In this manner, the split light relay optical system 24 guides the split light L3 such that a position different from an incident position of the parallel light L2 on the microlens array disk 22a serves as the irradiation surface M. The part R where the parallel light L2 becomes the split light L3 is not necessarily provided at a position with the axis core O interposed therebetween with respect to the irradiation surface M. For example, as indicated by the two-dot dashed line in FIG. 3, the part R where the parallel light L2 becomes the split light L3 may be disposed at a position rotated clockwise by 90° with respect to the irradiation surface M in the circumferential direction centering on the axis core O. This rotation angle (90°) is also an example and can be changed.

Returning to FIG. 1, the dichroic mirror 25 allows light with which the sample SP is irradiated (illumination light L4) to be transmitted therethrough and reflects return light L5 which is obtained by irradiating the sample SP with the illumination light L4 toward the optical filter 26. Specifically, the dichroic mirror 25 is disposed on the optical axis of the collimating lens 21 and between the microlens array disk 22a and the pinhole array disk 22b provided in the disk unit 22.

The dichroic mirror 25 is disposed between the microlens array disk 22a and the pinhole array disk 22b. The dichroic mirror 25 allows a plurality of light fluxes which have been split and converged by the microlenses 22e provided in the microlens array disk 22a to be transmitted therethrough. The light fluxes which have been transmitted through the dichroic mirror 25 are condensed in the pinholes 22f provided in the pinhole array disk 22b, pass through the pinholes 22f, and are emitted to the outside of the disk unit 22. At this time, since the illumination light L4 with which the microlens array disk 22a is irradiated has a uniform distribution of intensities and becomes parallel light, the illumination light L4 which passes through the pinholes 22f and is emitted to the outside of the disk unit 22 also has a uniform distribution of intensities.

In addition, in the return light L5 obtained by irradiating the sample SP with illumination light, the dichroic mirror 25 reflects the return light L5 which has been transmitted through the pinholes 22f provided in the pinhole array disk 22b toward the optical filter 26 disposed on the outward side in the radial direction centering on the axis core O. Namely, the dichroic mirror 25 allows light with which the microlens array disk 22a is irradiated via the split light relay optical system 24 and which has passed through the microlenses 22e (illumination light L4) to be transmitted therethrough and reflects light incident from the pinhole array disk 22b side (return light) toward the outward side of the microlens array disk 22a and the pinhole array disk 22b in the radial direction.

The optical filter 26 filters the return light L5 reflected by the dichroic mirror 25. Regarding this optical filter 26, a polarizing filter, an absorption filter (emission filter), a dichroic mirror, or the like can be used. The relay lens 27 is disposed between the optical filter 26 and the camera 40 and guides the return light L5 emitted from the optical filter 26 to the camera 40.

The microscope 30 irradiates the sample SP with illumination light generated in the disk unit 22 and guides the return light L5 obtained by irradiating the sample SP with the illumination light L4 to the disk unit 22. For example, the microscope 30 is an infinite distance correction optical system including an object lens 31. In FIG. 1, for the sake of convenience, the sample SP is illustrated inside the microscope 30, but it should be noted that the sample SP does not constitute the microscope 30 and the sample SP can be replaced.

The camera 40 images a confocal image of the sample SP which is irradiated with the illumination light L4. For example, this camera 40 is a camera including a solid-state imaging device such as a charge coupled device (CCD) or a complementary metal oxide semiconductor (CMOS) and is capable of imaging a two-dimensional still image or a moving image. For example, a display device (not illustrated) may display a confocal image of the sample SP obtained by the camera 40.

<Operation of Confocal Microscope>

When operation of the confocal microscope 1 starts, light is output from the light source 10, and the disk unit 22 starts to rotate (rotate around the rotation shaft 22c). The light L1 output from the light source 10 is input to the confocal scanner 20. It is assumed that light output from the light source 10 is light having a distribution of intensities (for example, light having a Gaussian distribution).

First, the light L1 input to the confocal scanner 20 incident on the collimating lens 21 is converted into the parallel light L2 by the collimating lens 21. The parallel light L2 is incident between the microlens array disk 22a and the pinhole array disk 22b from the collimating lens 21. The parallel light L2 is reflected toward the microlens array disk 22a by the reflection mirror 23 disposed between the microlens array disk 22a and the pinhole array disk 22b.

The parallel light L2 with which the microlens array disk 22a is irradiated is split into a plurality of light fluxes by the microlenses 22e provided in the microlens array disk 22a and is converted into the split light L3 constituted of a plurality of light fluxes. The split light L3 is emitted through the microlenses 22e and is reflected toward the Fourier lens 24b by the reflection mirror 24a. In the split light L3 incident on the Fourier lens 24b, each of the light fluxes is a parallel beam. These light fluxes are converted into light fluxes which are superimposed on the irradiation surface M. The split light L3 emitted from the Fourier lens 24b is reflected toward the reflection mirror 24c and is used for irradiating the irradiation surface M including the main point of the plurality of microlenses 22e.

At this time, the microlenses 22e and the Fourier lens 24b form the Koehler illumination system in which a flat surface including the main point of the plurality of microlenses 22e serves as the irradiation surface M. For this reason, each of the light fluxes of the split light L3 is converged at the focal point of each of the microlenses 22e, expands again thereafter, and becomes a parallel beam again by the Fourier lens 24b, and the irradiation surface M is irradiated therewith in a superimposed manner. In this manner, when each of the light fluxes is superimposed on the irradiation surface M, the split light L3 becomes the illumination light L4 having a uniform distribution of intensities.

The illumination light L4 is split into a plurality of light fluxes by the plurality of microlenses 22e. Each of the light fluxes is converged by the microlenses 22e and passes through the pinholes 22f of the pinhole array disk 22b. At this time, the illumination light L4 emitted through the microlenses 22e is transmitted through the dichroic mirror 25 and is incident on the pinhole array disk 22b. The illumination light L4 emitted through the pinholes 22f is emitted to the outside of the disk unit 22.

The illumination light L4 emitted to the outside of the disk unit 22 is used for irradiating the sample SP via the object lens 31 provided in the microscope 30. Here, the illumination light L4 emitted to the outside of the disk unit 22 is obtained by splitting light having a uniformized distribution of intensities. For this reason, the sample SP is irradiated with illumination light having a uniformized distribution of intensities.

The return light L5 (return light obtained by irradiating the sample SP with illumination light) from the sample SP is incident on the disk unit 22 via the object lens 31 provided in the microscope 30. Further, the return light L5 goes through the pinholes 22f formed in the pinhole array disk 22b of the disk unit 22 and then is reflected toward the optical filter 26 by the dichroic mirror 25.

The return light L5 reflected by the dichroic mirror 25 is incident on the camera 40 via the optical filter 26 and the relay lens 27 in this order and forms an image. Here, since the disk unit 22 rotates around the rotation shaft 22c, the illumination light L4 for irradiating the sample SP is used for scanning in accordance with rotation of the disk unit 22. Accordingly, the return light L5 corresponding to a scanning position of the illumination light L4 is successively input to the camera 40. In this manner, a confocal image of the sample SP is obtained by the camera 40.

As above, in the present embodiment, the confocal scanner 20 includes the microlens array disk 22a which has the plurality of microlenses 22e and is rotated. In addition, the confocal scanner 20 includes the pinhole array disk 22b. The pinhole array disk 22b has the plurality of pinholes 22f formed to be associated with the microlenses 22e. In addition, the pinhole array disk 22b is disposed so as to face the microlens array disk 22a and is rotated together with the microlens array disk 22a.

In addition, the confocal scanner 20 includes the split light relay optical system 24. The split light relay optical system 24 forms the Koehler illumination system in which the microlens array disk 22a serves as the irradiation surface M together with the microlenses 22e. In addition, the split light relay optical system 24 guides the split light L3 formed from the parallel light L2 which has been split into a plurality of light fluxes through the microlenses 22e to the irradiation surface M.

Moreover, the confocal scanner 20 includes the dichroic mirror 25. The dichroic mirror 25 is disposed between the microlens array disk 22a and the pinhole array disk 22b. In addition, the dichroic mirror 25 allows light with which the microlens array disk 22a is irradiated via the split light relay optical system 24 and which has passed through the microlenses 22e to be transmitted therethrough. In addition, the dichroic mirror 25 reflects light incident from the pinhole array disk 22b side toward the outward side of the microlens array disk 22a and the pinhole array disk 22b in the radial direction.

In such a confocal scanner 20, the Koehler illumination system is formed by the microlenses 22e of the microlens array disk 22a and the split light relay optical system 24. Namely, in the confocal scanner 20, the microlens array disk 22a and the motor 22d serve as both constituent elements for the confocal scanner generating the illumination light L4 and constituent elements for the homogenizer uniformizing a distribution of intensities of the illumination light L4. For this reason, according to the confocal scanner 20, there is no need to separately provide all the constituent elements for the homogenizer.

Therefore, according to the confocal scanner 20, while increase in device size and cost rise are curbed, a distribution of intensities of light emitted from the confocal scanner 20 is uniformized. Thus, according to the confocal scanner 20, the sample SP can be irradiated with the illumination light L4 having a uniform distribution of intensities, and a confocal image having a homogeneous brightness with no unevenness can be obtained.

In addition, in the confocal scanner 20, the split light relay optical system 24 guides the split light L3 such that a position different from the incident position of the parallel light L2 on the microlens array disk 22a serves as the irradiation surface M. Namely, in the confocal scanner 20, the distribution of intensities is uniformized at a part of the microlens array disk 22a which is not used when only the illumination light L4 is generated. Therefore, a space for disposing the microlenses 22e of the microlens array disk 22a can be effectively utilized.

In addition, in the confocal scanner 20, the split light relay optical system 24 includes the reflection mirror 24a and the reflection mirror 24c which function as the split light guiders. The reflection mirror 24a and the reflection mirror 24c guide the split light L3 emitted from the microlens array disk 22a to a side opposite to the pinhole array disk 22b to the surface of the microlens array disk 22a on a side opposite to the pinhole array disk 22b. In addition, the split light relay optical system 24 includes the Fourier lens 24b which is disposed on the optical path of the split light L3 and forms the Koehler illumination system together with the microlenses 22e.

In such a confocal scanner 20, the split light L3 is emitted from the microlens array disk 22a to a side opposite to the pinhole array disk 22b. In addition, the split light L3 is guided from the microlens array disk 22a to a side opposite to the pinhole array disk 22b. For this reason, as illustrated in FIG. 1, the light source 10 can be disposed on the outward side of the microlens array disk 22a and the pinhole array disk 22b in the radial direction. Therefore, compared to when the microlens array disk 22a, the pinhole array disk 22b, and the light source 10 are arrayed along the axis core O, the dimension of the confocal scanner 20 in a direction along the axis core O can be reduced.

In addition, the confocal scanner 20 includes the rotation shaft 22c which connects the microlens array disk 22a and the pinhole array disk 22b to each other, and the motor 22d which rotatably drives the rotation shaft 22c. For this reason, the microlens array disk 22a and the pinhole array disk 22b can be rotatably driven with the single motor 22d. Therefore, in the confocal scanner 20, increase in device size and cost rise are further curbed.

In addition, the confocal microscope 1 includes the confocal scanner 20 which emits the illumination light L4 for scanning the sample SP, the light source 10 which outputs light toward the confocal scanner 20, and the camera 40 which images a confocal image of the sample SP irradiated with the illumination light L4. According to the confocal scanner 20, while increase in device size and cost rise are curbed, a distribution of intensities of light emitted from the confocal scanner 20 can be uniformized. Thus, according to the confocal microscope 1, the sample SP can be irradiated with the illumination light L4 having a uniform distribution of intensities, and a confocal image having a homogeneous brightness with no unevenness can be obtained.

Second Embodiment

Figure 4:
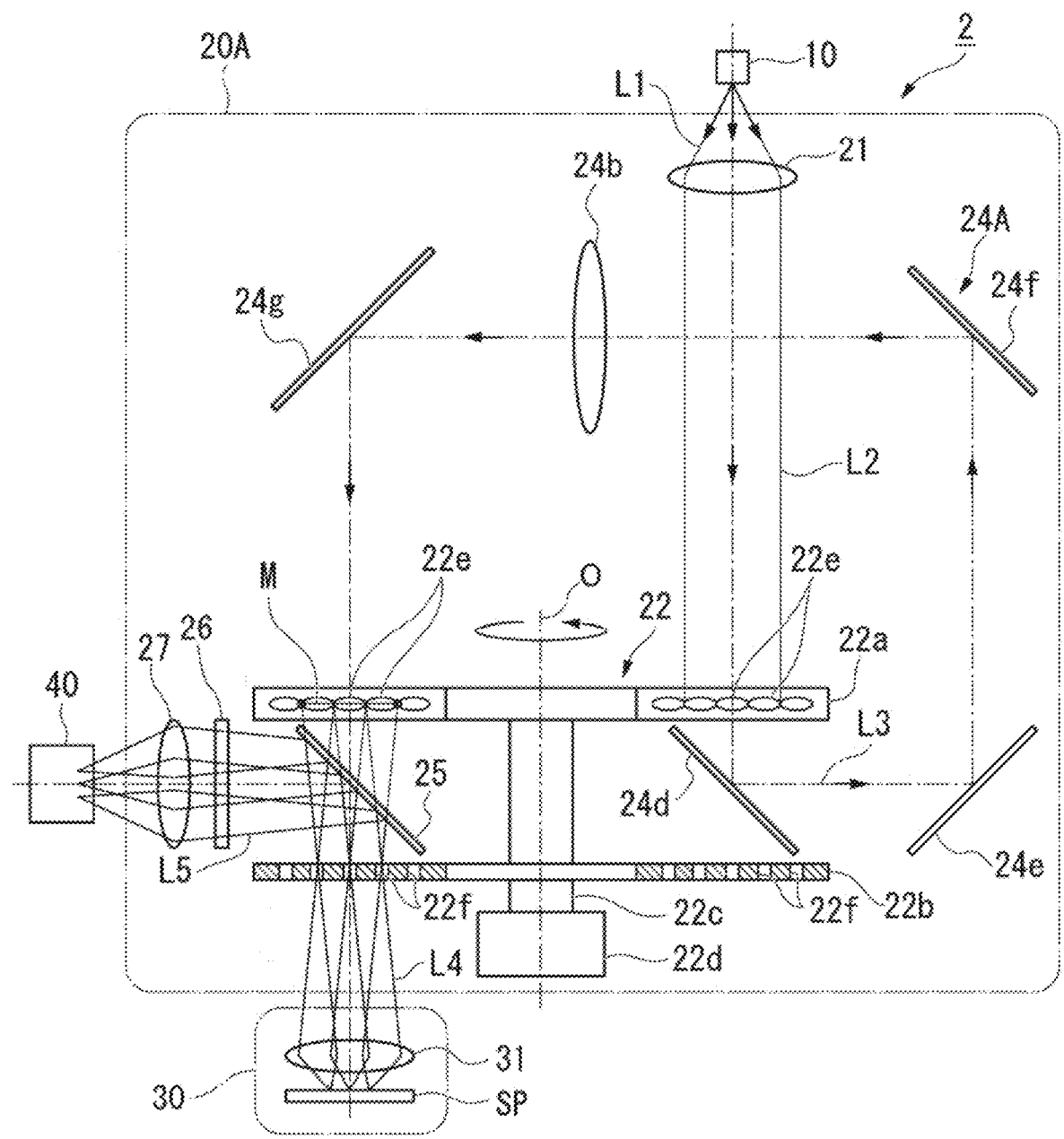
FIG. 4 is a view illustrating a constitution of a main part of a confocal microscope according to a second embodiment of the present invention.

FIG. 4 is a view illustrating a constitution of a main part of a confocal microscope according to a second embodiment of the present invention. In FIG. 4, the same reference signs are applied to the same constitution as the constitution illustrated in FIG. 1. As illustrated in FIG. 4, a confocal microscope 2 of the present embodiment has a constitution in which the confocal scanner 20 of the confocal microscope 1 illustrated in FIG. 1 is replaced with a confocal scanner 20A and disposition of the light source 10 is changed.

In the confocal microscope 2, the light source 10 is disposed on a side of the microlens array disk 22a opposite to the pinhole array disk 22b. In addition, in the confocal scanner 20A, the collimating lens 21 is disposed between the light source 10 and the microlens array disk 22a.

For this reason, in the confocal scanner 20A, the parallel light L2 is incident on the surface of the microlens array disk 22a on a side opposite to the pinhole array disk 22b. In addition, the split light L3 is emitted from the surface of the microlens array disk 22a on the pinhole array disk 22b side toward the pinhole array disk 22b.

In the confocal scanner 20A, the reflection mirror 23 included in the confocal scanner 20 illustrated in FIG. 1 is not provided, and a split light relay optical system 24A is provided in place of the split light relay optical system 24. The split light relay optical system 24A includes a plurality of reflection mirrors for guiding the split light L3 emitted from the microlens array disk 22a toward the pinhole array disk 22b to the surface of the microlens array disk 22a on a side opposite to the pinhole array disk 22b.

Specifically, the split light relay optical system 24A includes a reflection mirror 24d which is disposed between the microlens array disk 22a and the pinhole array disk 22b. This reflection mirror 24d reflects the split light L3 emitted from the microlens array disk 22a toward the outward side of the microlens array disk 22a in the radial direction. In addition, the split light relay optical system 24A includes a reflection mirror 24e which is disposed on the outward side of the microlens array disk 22a and the pinhole array disk 22b in the radial direction. This reflection mirror 24e reflects the split light L3 which has been reflected by the reflection mirror 24d to the outward side of the microlens array disk 22a and the pinhole array disk 22b in the radial direction. The reflection mirror 24e reflects the split light L3 such that the optical path of the split light L3 becomes parallel to the axis core O and is directed toward the light source 10.

In addition, the split light relay optical system 24A includes a reflection mirror 24f which is disposed in the middle of the optical path of the split light L3 and between the reflection mirror 24e and the Fourier lens 24b. This reflection mirror 24f reflects the split light L3 incident from the reflection mirror 24e in directions orthogonal to the axis core O and directed toward the axis core O. In addition, the split light relay optical system 24A includes a reflection mirror 24g which is disposed in the middle of the optical path of the split light L3 and between the Fourier lens 24b and the irradiation surface M. This reflection mirror 24g is disposed with the axis core O interposed between the reflection mirror 24g and the reflection mirror 24f when viewed in a direction along the axis core O.

The reflection mirror 24d, the reflection mirror 24e, the reflection mirror 24f, and the reflection mirror 24g form a split light guider which guides the split light L3 emitted from the microlens array disk 22a toward the pinhole array disk 22b to the surface of the microlens array disk 22a on a side opposite to the pinhole array disk 22b.

In such a confocal scanner 20A, the parallel light L2 is incident on the surface of the microlens array disk 22a on a side opposite to the pinhole array disk 22b. In addition, the split light L3 guided by the split light relay optical system 24A is incident on the surface of the microlens array disk 22a on a side opposite to the pinhole array disk 22b. Namely, in the confocal scanner 20A, both the parallel light L2 and the split light L3 are incident on the same surface of the microlens array disk 22a.

As described above, the confocal scanner 20A of the present embodiment includes the split light relay optical system 24A. The split light relay optical system 24A includes the reflection mirror 24d, the reflection mirror 24e, the reflection mirror 24f, and the reflection mirror 24g forming the split light guider. These reflection mirrors reflect the split light L3 emitted from the microlens array disk 22a to the pinhole array disk 22b side toward the outward side of the microlens array disk 22a and the pinhole array disk 22b in the radial direction from between the microlens array disk 22a and the pinhole array disk 22b. In addition, these reflection mirrors guide the split light L3 to the surface of the microlens array disk 22a on a side opposite to the pinhole array disk 22b. Moreover, the split light relay optical system 24A includes the Fourier lens 24b which is disposed on the optical path of the split light L3 and forms the Koehler illumination system together with the microlenses 22e.

According to such a confocal scanner 20A, both the parallel light L2 and the split light L3 are incident on the same surface of the microlens array disk 22a. For this reason, design of the microlenses 22e becomes simple, and the microlenses 22e having a small aberration can be easily realized.

Third Embodiment

Figure 5:
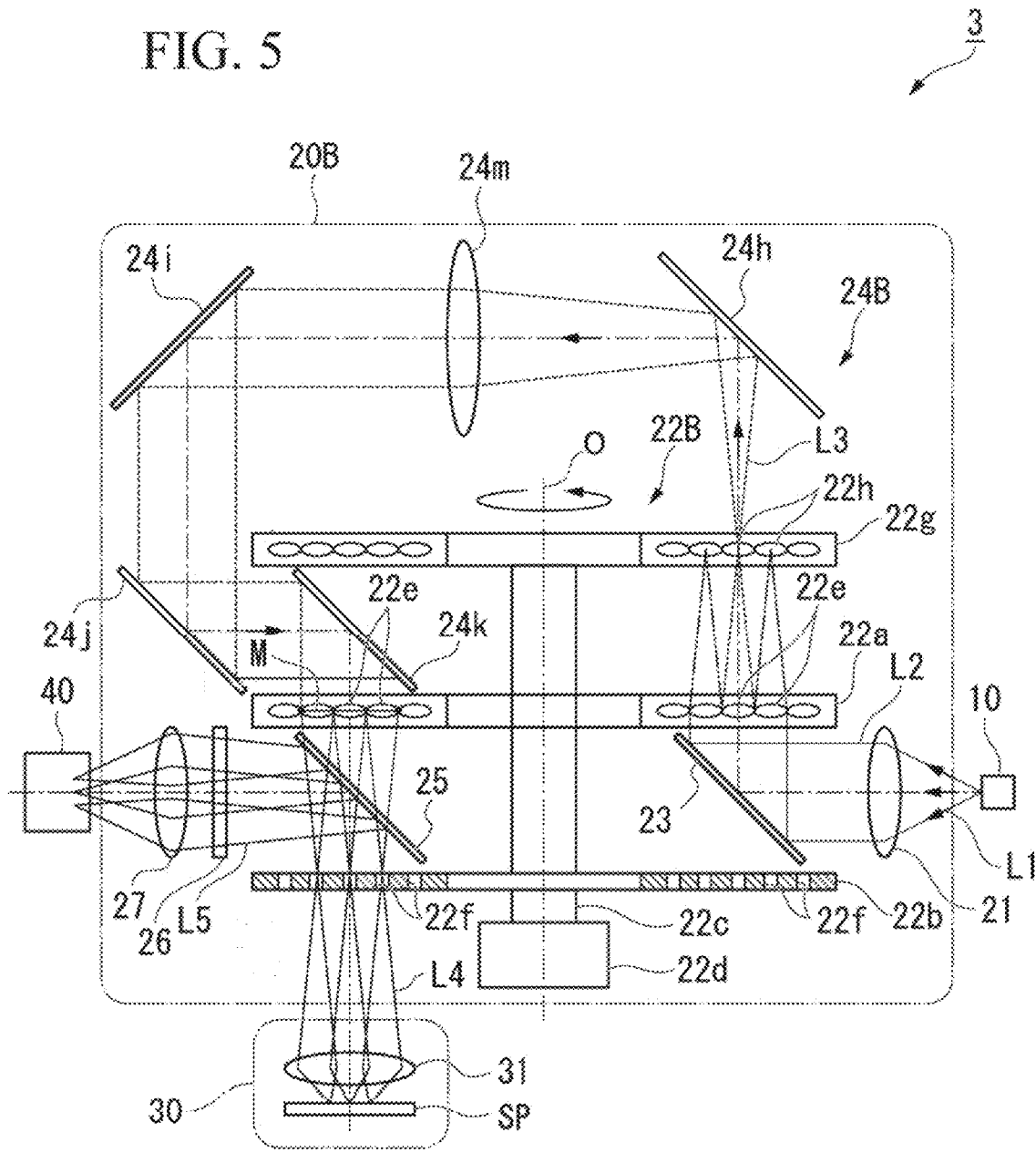
FIG. 5 is a view illustrating a constitution of a main part of a confocal microscope according to a third embodiment of the present invention.

FIG. 5 is a view illustrating a constitution of a main part of a confocal microscope according to a third embodiment of the present invention. In FIG. 5, the same reference signs are applied to the same constitution as the constitution illustrated in FIG. 1. As illustrated in FIG. 5, a confocal microscope 3 of the present embodiment has a constitution in which the confocal scanner 20 of the confocal microscope 1 illustrated in FIG. 1 is replaced with a confocal scanner 20B.

In the confocal microscope 3, the confocal scanner 20B includes a disk unit 22B in place of the disk unit 22. The disk unit 22B includes a second microlens array disk 22g in addition to the microlens array disk 22a and the pinhole array disk 22b.

The second microlens array disk 22g is a disk having a circular plate shape having a plurality of second microlenses 22h disposed in a predetermined pattern (for example, spirally disposed at equal pitch). These second microlenses 22h are formed to be associated with the microlenses 22e of the microlens array disk 22a. The second microlens array disk 22g is disposed a side opposite to the pinhole array disk 22b with respect to the microlens array disk 22a and faces the microlens array disk 22a with a certain gap therebetween. The second microlens array disk 22g is connected to the microlens array disk 22a through the rotation shaft 22c and is rotated in the circumferential direction centering on the axis core O together with the microlens array disk 22a.

Such a second microlens array disk 22g is disposed on the focal surface of the microlenses 22e of the microlens array disk 22a. Each of the second microlenses 22h in the second microlens array disk 22g is disposed on the rear focal surface of the associated microlenses 22e.

In addition, in the confocal microscope 3, the confocal scanner 20B includes a split light relay optical system 24B in place of the split light relay optical system 24 of the confocal scanner 20. The split light relay optical system 24B includes a plurality of reflection mirrors for guiding the split light L3 emitted from the second microlens array disk 22g to the surface of the microlens array disk 22a on a side opposite to the pinhole array disk 22b.

Specifically, the split light relay optical system 24B includes a reflection mirror 24h which is disposed on a side of the second microlens array disk 22g opposite to the microlens array disk 22a. This reflection mirror 24h reflects the incident split light L3 in directions orthogonal to the axis core O and directed toward the axis core O. In addition, the split light relay optical system 24B includes a reflection mirror 24i which is disposed with the axis core O interposed therebetween when viewed in a direction along the axis core O. As illustrated in FIG. 5, this reflection mirror 24i is disposed on the outward side of the disk unit 22B and reflects the split light L3 incident from the reflection mirror 24i via a Fourier lens 24m (which will be described below) in directions parallel to the axis core O and directed toward the microlens array disk 22a.

In addition, the split light relay optical system 24B includes a reflection mirror 24j which is disposed on the outward side of the disk unit 22B and between the microlens array disk 22a and the second microlens array disk 22g in a direction along the axis core O. This reflection mirror 24j reflects the split light L3 incident from the reflection mirror 24i toward an inward side of the microlens array disk 22a in the radial direction. In addition, the split light relay optical system 24B includes a reflection mirror 24k which is disposed between the microlens array disk 22a and the second microlens array disk 22g. This reflection mirror 24k reflects the illumination light L4 incident from the reflection mirror 24j to the surface of the microlens array disk 22a on a side opposite to the pinhole array disk 22b.

The reflection mirror 24h, the reflection mirror 24i, the reflection mirror 24j, and the reflection mirror 24k form a split light guider which guides the split light L3 emitted from the microlens array disk 22a and having passed through the second microlens array disk 22g to the surface of the microlens array disk 22a on a side opposite to the pinhole array disk 22b.

In addition, the split light relay optical system 24B includes the Fourier lens 24m which is disposed between the reflection mirror 24h and the reflection mirror 24i. The Fourier lens 24m is disposed such that the front focal surface of the Fourier lens 24m overlaps the main point of the second microlenses 22h of the second microlens array disk 22g.

At this time, the microlenses 22e, the second microlenses 22h, and the Fourier lens 24m form the Koehler illumination system in which the microlens array disk 22a serves as the irradiation surface M. For this reason, each of the light fluxes of the split light L3 is converged at the focal point of each of the microlenses 22e (that is, the second microlenses 22h), expands again thereafter, and becomes a parallel beam again by the Fourier lens 24m, and the irradiation surface M is irradiated therewith in a superimposed manner. In this manner, when each of the light fluxes is superimposed on the irradiation surface M, the split light L3 becomes the illumination light L4 having a uniform distribution of intensities.

Since the split light L3 passes through the second microlenses 22*h* in addition to the microlenses 22*e*, compared to when passing through only the microlenses 22*e*, the distribution of intensities of the split light L3 with which the irradiation surface M is irradiated can be further uniformized. The microlenses 22*e* and the second microlenses 22*h* may have perfectly the same shape but may have different properties.

As described above, the confocal scanner 20B of the present embodiment includes the second microlens array disk 22*g*. The second microlens array disk 22*g* has the plurality of second microlenses 22*h* formed to be associated with the microlenses 22*e*. In addition, the second microlens array disk 22*g* is disposed so as to face the microlens array disk 22*a* and is rotated from a side opposite to the pinhole array disk 22*b*. Moreover, in the confocal scanner 20B, the split light relay optical system 24B includes the Fourier lens 24*m*. The Fourier lens 24*m* is disposed on the optical path of the split light L3 and forms the Koehler illumination system together with the microlenses 22*e* and the second microlenses 22*h*. In addition, the split light relay optical system 24B includes the reflection mirrors (the reflection mirror 24*h*, the reflection mirror 24*i*, the reflection mirror 24*j*, and the reflection mirror 24*k*) which function as the split light guiders. These reflection mirrors guide the split light L3 emitted from the microlens array disk 22*a* to the second microlens array disk 22*g* side and transmitted through the second microlens array disk 22*g* to the surface of the microlens array disk 22*a* on a side opposite to the pinhole array disk 22*b*.

According to such a confocal scanner 20B, since the split light L3 passes through the second microlenses 22*h* in addition to the microlenses 22*e*, compared to when passing through only the microlenses 22*e*, the distribution of intensities of the split light L3 with which the irradiation surface M is irradiated can be further uniformized.

Fourth Embodiment

Figure 6:
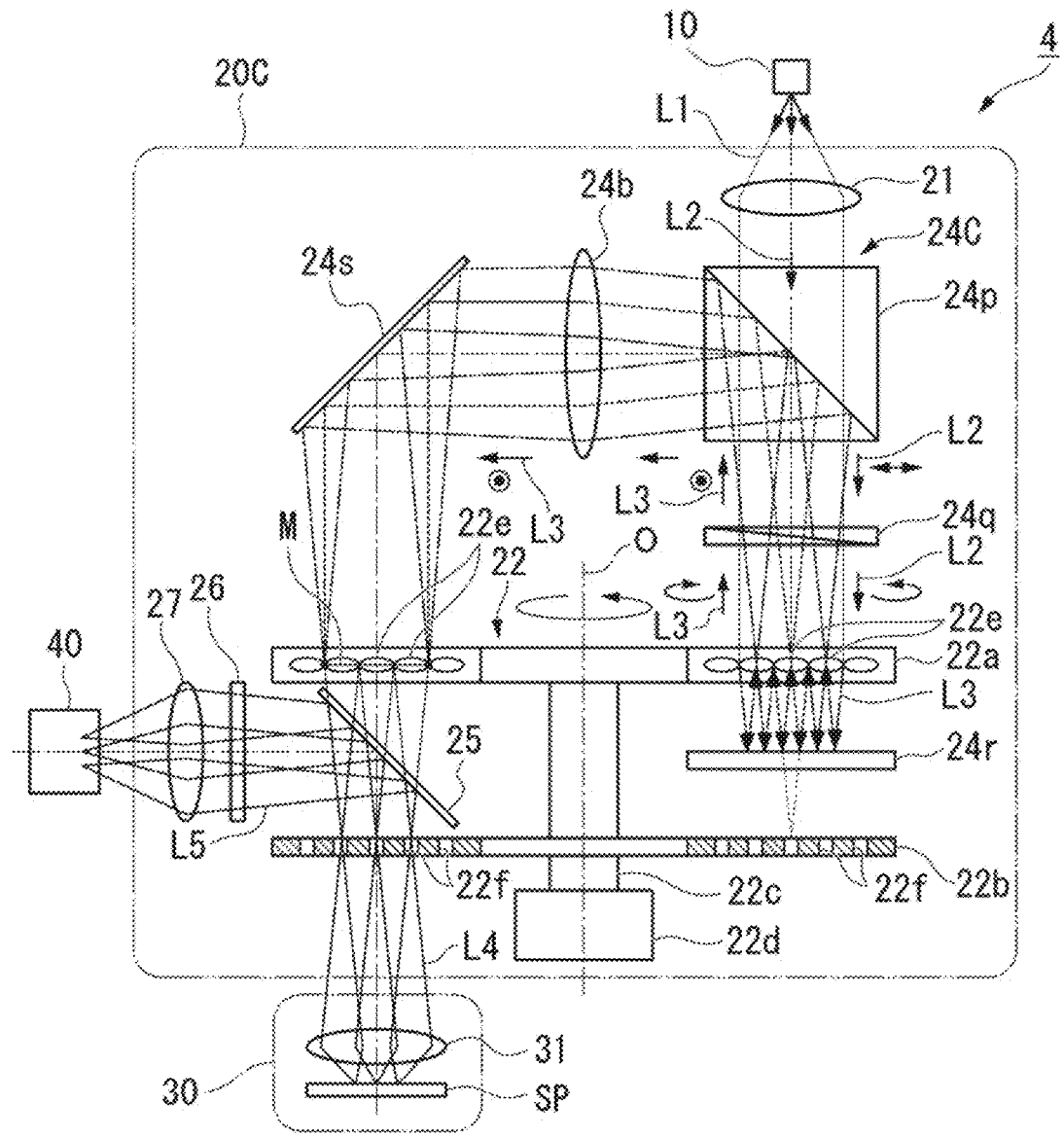
FIG. 6 is a view illustrating a constitution of a main part of a confocal microscope according to a fourth embodiment of the present invention.

FIG. 6 is a view illustrating a constitution of a main part of a confocal microscope according to a fourth embodiment of the present invention. In FIG. 6, the same reference signs are applied to the same constitution as the constitution illustrated in FIG. 1. As illustrated in FIG. 6, a confocal microscope 4 of the present embodiment has a constitution in which the confocal scanner 20 of the confocal microscope 1 illustrated in FIG. 1 is replaced with a confocal scanner 20C and disposition of the light source 10 is changed.

In the confocal microscope 4, the light source 10 is disposed on a side of the microlens array disk 22*a* opposite to the pinhole array disk 22*b*. In the present embodiment, the light L1 emitted from the light source 10 is linearly polarized light (P-polarized light). In addition, in the confocal scanner 20C, the collimating lens 21 is disposed between the light source 10 and the microlens array disk 22*a*.

For this reason, in the confocal scanner 20C, the parallel light L2 is incident on the surface of the microlens array disk 22*a* on a side opposite to the pinhole array disk 22*b*. In addition, the split light L3 is emitted from the surface of the microlens array disk 22*a* on the pinhole array disk 22*b* side toward the pinhole array disk 22*b*.

In the confocal scanner 20C, the reflection mirror 23 included in the confocal scanner 20 illustrated in FIG. 1 is not provided, and a split light relay optical system 24C is provided in place of the split light relay optical system 24. The split light relay optical system 24C includes a polarization beam splitter 24*p*, a ¼ wavelength plate 24*q*, a split light reflection mirror 24*r*, and a reflection mirror 24*s*.

The polarization beam splitter 24*p* is disposed between the collimating lens 21 and the microlens array disk 22*a*, allows P-polarized light to be transmitted therethrough, and reflects S-polarized light toward the Fourier lens 24*b*. As described above, in the present embodiment, since the light L1 emitted from the light source 10 is P-polarized light, the parallel light L2 is also P-polarized light. For this reason, the polarization beam splitter 24*p* allows the parallel light L2 to be transmitted therethrough. On the other hand, as described below, the split light L3 incident on the polarization beam splitter 24*p* is S-polarized light. For this reason, the polarization beam splitter 24*p* reflects the incident split light L3.

The ¼ wavelength plate 24*q* is disposed between the polarization beam splitter 24*p* and the microlens array disk 22*a*. The ¼ wavelength plate 24*q* is an optical element for changing a phase of incident light by a ¼ wavelength and emitting the light. The ¼ wavelength plate 24*q* converts the parallel light L2 of incident P-polarized light transmitted through the polarization beam splitter 24*p* into circularly polarized light and emits the light. In addition, the ¼ wavelength plate 24*q* converts the split light L3 of circularly polarized light incident from the microlens array disk 22*a* into S-polarized light and emits the light.

The split light reflection mirror 24*r* is disposed between the microlens array disk 22*a* and the pinhole array disk 22*b* and reflects the split light L3 emitted from the microlens array disk 22*a* to the pinhole array disk 22*b* side again toward the ¼ wavelength plate 24*q* via the microlens array disk 22*a*. This split light reflection mirror 24*r* is disposed at a position at half the focal distance of the microlenses 22*e* from the microlens array disk 22*a*.

The reflection mirror 24*s* is disposed so as to face the polarization beam splitter 24*p* with the Fourier lens 24*b* interposed therebetween. When viewed in a direction along the axis core O, the reflection mirror 24*s* is disposed at a position with the axis core O interposed between the reflection mirror 24*s* and the polarization beam splitter 24*p*. This reflection mirror 24*s* reflects the split light L3 of S-polarized light reflected by the polarization beam splitter 24*p* toward the irradiation surface M. Such a reflection mirror 24*s* functions as a split light guider for guiding the split light L3 reflected by the polarization beam splitter 24*p* to the surface of the microlens array disk 22*a* on a side opposite to the pinhole array disk 22*b*.

In such a confocal scanner 20C, the parallel light L2 which has become P-polarized light is transmitted through the polarization beam splitter 24*p* and is converted into circularly polarized light by the ¼ wavelength plate 24*q*. The parallel light L2 which has been converted into circularly polarized light is incident on the microlens array disk 22*a* and is converted into the split light L3. The split light L3 emitted from the microlens array disk 22*a* toward the pinhole array disk 22*b* is reflected toward the ¼ wavelength plate 24*q* by the split light reflection mirror 24*r*.

The split light L3 reflected by the ¼ wavelength plate 24*q* is transmitted through the microlens array disk 22*a* again and is converted into S-polarized light by the ¼ wavelength plate 24*q*. The split light L3 converted into S-polarized light by the ¼ wavelength plate 24*q* is reflected by the polarization beam splitter 24*p*, and the irradiation surface M is irradiated therewith via the Fourier lens 24*b* and the reflection mirror 24*s*.

As described above, in the confocal scanner 20C of the present embodiment, the parallel light L2 is P-polarized light. In addition, in the confocal scanner 20, the split light relay optical system 24C includes the polarization beam splitter 24p which reflects the split light L3 and allows the parallel light L2 to be transmitted therethrough, and the ¼ wavelength plate 24q which is disposed between the polarization beam splitter 24p and the microlens array disk 22a. In addition, the split light relay optical system 24C includes the split light reflection mirror 24r. The split light reflection mirror 24r reflects the split light L3 emitted from the microlens array disk 22a to the pinhole array disk 22b side toward the ¼ wavelength plate via the microlens array disk 22a. In addition, the split light relay optical system 24C includes the reflection mirror 24s for guiding the split light L3 reflected by the polarization beam splitter 24p to the surface of the microlens array disk 22a on a side opposite to the pinhole array disk 22b. Moreover, the split light relay optical system 24C includes the Fourier lens 24b which is disposed on the optical path of the split light L3 and forms the Koehler illumination system together with the microlenses 22e.

According to such a confocal scanner 20C, the split light L3 is caused to pass through one microlens array disk 22a twice between the ¼ wavelength plate 24q and the split light reflection mirror 24r. For this reason, the distribution of intensities of the illumination light L4 can be further uniformized than when the split light L3 is caused to pass through the microlens array disk 22a only once.

Hereinabove, the confocal scanner and the confocal microscope according to the embodiments of the present invention have been described, but the present invention is not limited to the foregoing embodiments and can be freely changed within the scope of the present invention. For example, in the foregoing second embodiment, an example in which the reflection mirror 24e is disposed on the outward side of the disk unit 22 in the radial direction has been described. However, the microlens array disk 22a may be increased in diameter such that the microlens array disk 22a covers the reflection mirror 24e when viewed in a direction along the axis core O. In such a case, the intensity of the illumination light L4 can be further uniformized by increasing the number of times of causing the split light L3 to pass through the microlens array disk 22a.

In addition, in the foregoing fourth embodiment, an example in which the light L1 emitted from the light source 10 is P-polarized light has been described. However, the light L1 output from the light source 10 may be S-polarized light. In such a case, the polarization beam splitter 24p allows S-polarized light to be transmitted therethrough and reflects P-polarized light.

[Supplementary Note]

A confocal scanner (20, 20A, 20B, or 20C) according to an aspect of the present invention may include: a first disk (22a) which includes a plurality of microlenses (22e); a second disk (22b) which includes a plurality of pinholes (22f) formed to be associated with the microlenses, wherein one surface (A1) of the first disk faces another surface (B2) of the second disk, and the second disk rotates together with the first disk; a light guider (24, 24A, 24B, or 24C) which forms a Koehler illumination system together with the microlenses within a first region (R) set in the first disk, wherein the light guider guides a plurality of rays of split light (L3) split by the microlenses within the first region to a second region (M) set in the first disk; and a beam splitter (25) which is disposed between the one surface (A1) of the first disk and the another surface (B2) of the second disk, wherein light which has passed through the microlenses within the second region transmits through the beam splitter, and the beam splitter reflects light incident from the second disk toward an outward side of the first disk and the second disk in a radial direction.

In addition, in the confocal scanner according to the aspect of the present invention, the first region and the second region are at different positions on the first disk.

In addition, in the confocal scanner according to the aspect of the present invention, the light guider may include: a split light guider which guides split light emitted from another surface (B1) of the first disk in a direction of the another surface (B1) of the first disk; and a Fourier lens (24b or 24m) which is disposed on an optical path of the split light and forms a part of the Koehler illumination system.

In addition, in the confocal scanner according to the aspect of the present invention, the light guider may include: a split light guider which reflects split light emitted from the one surface (A1) of the first disk to the second disk toward the outward side of the first disk and the second disk in the radial direction from between the one surface (A1) of the first disk and the another surface (B2) of the second disk, wherein the split light guider guides the reflected light in a direction of another surface (B1) of the first disk; and a Fourier lens which is disposed on an optical path of the split light and forms a part of the Koehler illumination system.

In addition, the confocal scanner according to the aspect of the present invention further may include: a third disk (22g) which includes a plurality of second microlenses (22h) formed to be associated with the microlenses, wherein one surface (A3) of the third disk faces another surface (B1) of the first disk, and the third disk rotates together with the first disk and the second disk. The light guider may include: a split light guider which guides split light, which has emitted from the another surface (B1) of the first disk to the third disk and transmitted through the third disk, in a direction of the another surface (B1) of the first disk; and a Fourier lens which is disposed on an optical path of the split light and forms a part of the Koehler illumination system.

In addition, in the confocal scanner according to the aspect of the present invention, the light guider may include: a polarization beam splitter (24p), wherein polarized light incident on the first region transmits through the polarization beam splitter, and the polarization beam splitter reflects the split light; a ¼ wavelength plate (24q) which is disposed between the polarization beam splitter and the first disk; a reflection mirror (24r) which reflects the split light emitted from the one surface (A1) of the first disk to the second disk toward the ¼ wavelength plate via the first disk; a split light guider which guides the split light reflected by the polarization beam splitter to another surface (B1) of the first disk; and a Fourier lens which is disposed on an optical path of the split light and forms a part of the Koehler illumination system.

In addition, the confocal scanner according to the aspect of the present invention further may include: a coupling shaft (22c) which connects the first disk and the second disk to each other; and a driver (22d) which rotatably drives the coupling shaft.

In addition, the confocal scanner according to the aspect of the present invention further may include: an optical filter (26) which filters the light reflected by the beam splitter; and a relay lens (27) which forms an image of the light emitted from the optical filter.

In addition, the confocal scanner according to the aspect of the present invention further may include: a collimating lens (21) which converts light emitted from a light source into parallel light; and a reflection mirror (23) which reflects the parallel light, which has been emitted from the collimating lens, toward the first disk.

In addition, in the confocal scanner according to the aspect of the present invention, the collimating lens is disposed on the outward side of the first disk and the second disk in the radial direction such that an optical axis of the parallel light passes through an area between the first disk and the second disk.

A confocal microscope according to another aspect of the present invention may include: the confocal scanner according to any one of those described above, which emits illumination light for scanning a sample; a light source (10) which outputs light for generating the illumination light; and an imaging device (40) which images a confocal image of the sample.

In addition, in the confocal microscope according to the aspect of the present invention, the first region and the second region are at different positions on the first disk.

In addition, in the confocal microscope according to the aspect of the present invention, the light guider may include: a split light guider which guides split light emitted from another surface of the first disk in a direction of the another surface of the first disk; and a Fourier lens which is disposed on an optical path of the split light and forms a part of the Koehler illumination system.

In addition, in the confocal microscope according to the aspect of the present invention, the light guider may include: a split light guider which reflects split light emitted from the one surface of the first disk to the second disk toward the outward side of the first disk and the second disk in the radial direction from between the one surface of the first disk and the another surface of the second disk, wherein the split light guider guides the reflected light in a direction of another surface of the first disk; and a Fourier lens which is disposed on an optical path of the split light and forms a part of the Koehler illumination system.

In addition, in the confocal microscope according to the aspect of the present invention, the confocal scanner may further include: a third disk which includes a plurality of second microlenses formed to be associated with the microlenses, wherein one surface of the third disk faces another surface of the first disk, and the third disk rotates together with the first disk and the second disk. The light guider may further include: a split light guider which guides split light, which has emitted from the another surface of the first disk to the third disk and transmitted through the third disk, in a direction of the another surface of the first disk; and a Fourier lens which is disposed on an optical path of the split light and forms a part of the Koehler illumination system.

In addition, in the confocal microscope according to the aspect of the present invention, the light guider may include: a polarization beam splitter, wherein polarized light incident on the first region transmits through the polarization beam splitter, and the polarization beam splitter reflects the split light; a ¼ wavelength plate which is disposed between the polarization beam splitter and the first disk; a reflection mirror which reflects the split light emitted from the one surface of the first disk to the second disk toward the ¼ wavelength plate via the first disk; a split light guider which guides the split light reflected by the polarization beam splitter to another surface of the first disk; and a Fourier lens which is disposed on an optical path of the split light and forms a part of the Koehler illumination system.

In addition, in the confocal microscope according to the aspect of the present invention, the confocal scanner may further include: a coupling shaft which connects the first disk and the second disk to each other; and a driver which rotatably drives the coupling shaft.

In addition, in the confocal microscope according to the aspect of the present invention, the confocal scanner may further include: an optical filter which filters the light reflected by the beam splitter; and a relay lens which forms an image of the light emitted from the optical filter.

In addition, in the confocal microscope according to the aspect of the present invention, the confocal scanner may further include: a collimating lens which converts light emitted from a light source into parallel light; and a reflection mirror which reflects the parallel light, which has been emitted from the collimating lens, toward the first disk.

In addition, in the confocal microscope according to the aspect of the present invention, the collimating lens is disposed on the outward side of the first disk and the second disk in the radial direction such that an optical axis of the parallel light passes through an area between the first disk and the second disk.

According to the present invention, it is possible to achieve an effect in which increase in device size and cost rise can be curbed and a confocal image having a uniform brightness and high image quality can be obtained.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A confocal scanner comprising:
a first disk which comprises a plurality of microlenses;
a second disk which comprises a plurality of pinholes formed to be associated with the microlenses, wherein one surface of the first disk faces another surface of the second disk, and the second disk rotates together with the first disk;
a light guider which forms a Koehler illumination system having a Fourier lens together with microlenses within a first region set in the first disk, wherein the light guider guides a plurality of rays of split light split by the microlenses within the first region to a second region set in the first disk; and a beam splitter which is disposed between the one surface of the first disk and the another surface of the second disk, wherein light which has passed through microlenses within the second region transmits through the beam splitter, and the beam splitter reflects light incident from the second disk toward an outward side of the first disk and the second disk in a radial direction.

2. The confocal scanner according to claim 1,
wherein the first region and the second region are at different positions on the first disk.

3. The confocal scanner according to claim 1,
wherein the light guider comprises:
a split light guider which guides the split light emitted from the first region of the first disk toward the second region of the first disk.

4. The confocal scanner according to claim 1,
wherein the light guider comprises:
a split light guider which reflects the split light emitted from the first region of the first disk to the second disk toward an outward side of the first disk and the second disk in the radial direction from between the first disk and the second disk, wherein the split light guider guides the reflected light toward the second region of the first disk.

5. The confocal scanner according to claim 1, further comprising:
a third disk which comprises a plurality of second microlenses formed to be associated with the microlenses of the first disk, wherein one surface of the third disk faces another surface of the first disk, and the third disk rotates together with the first disk and the second disk,
wherein the light guider comprises:
a split light guider which guides the split light, which has emitted from the first region of the first disk to the third disk and transmitted through the third disk, toward the second region of the first disk.

6. The confocal scanner according to claim 1,
wherein the light guider comprises:
a polarization beam splitter, wherein polarized light incident on the first region transmits through the polarization beam splitter, and the polarization beam splitter reflects the split light;
a ¼ wavelength plate which is disposed between the polarization beam splitter and the first disk;
a reflection mirror which reflects the split light emitted from the first region of the first disk to the second disk toward the ¼ wavelength plate via the first disk; and
a split light guider which guides the split light reflected by the polarization beam splitter to the second region of the first disk.

7. The confocal scanner according to claim 1, further comprising:
a coupling shaft which connects the first disk and the second disk to each other; and
a driver which rotatably drives the coupling shaft.

8. The confocal scanner according to claim 1, further comprising:
an optical filter which filters the light reflected by the beam splitter; and
a relay lens which forms an image of the light emitted from the optical filter.

9. The confocal scanner according to claim 1, further comprising:
a collimating lens which converts light emitted from a light source into parallel light; and
a reflection mirror which reflects the parallel light, which has been emitted from the collimating lens, toward the first disk.

10. The confocal scanner according to claim 9,
wherein the collimating lens is disposed on an outward side of the first disk and the second disk in the radial direction such that an optical axis of the parallel light passes through an area between the first disk and the second disk.

11. A confocal microscope comprising:
the confocal scanner according to claim 1, which emits illumination light for scanning a sample;
a light source which outputs light for generating the illumination light; and
a camera which images a confocal image of the sample.

12. The confocal microscope according to claim 11,
wherein the first region and the second region are at different positions on the first disk.

13. The confocal microscope according to claim 11,
wherein the light guider comprises:
a split light guider which guides the split light emitted from the first region of the first disk toward the second region of the first disk.

14. The confocal microscope according to claim 11,
wherein the light guider comprises:
a split light guider which reflects the split light emitted from the first region of the first disk to the second disk toward an outward side of the first disk and the second disk in the radial direction from between the first disk and the second disk, wherein the split light guider guides the reflected light toward the second region of the first disk.

15. The confocal microscope according to claim 11,
wherein the confocal scanner further comprises:
a third disk which comprises a plurality of second microlenses formed to be associated with the microlenses of the first disk, wherein one surface of the third disk faces another surface of the first disk, and the third disk rotates together with the first disk and the second disk,
wherein the light guider comprises:
a split light guider which guides the split light, which has emitted from the first region of the first disk to the third disk and transmitted through the third disk toward the second region of the first disk.

16. The confocal microscope according to claim 11,
wherein the light guider comprises:
a polarization beam splitter, wherein polarized light incident on the first region transmits through the polarization beam splitter, and the polarization beam splitter reflects the split light;
a ¼ wavelength plate which is disposed between the polarization beam splitter and the first disk;
a reflection mirror which reflects the split light emitted from the first region of the first disk to the second disk toward the ¼ wavelength plate via the first disk; and
a split light guider which guides the split light reflected by the polarization beam splitter to the second region of the first disk.

17. The confocal microscope according to claim 11,
wherein the confocal scanner further comprises:
a coupling shaft which connects the first disk and the second disk to each other; and
a driver which rotatably drives the coupling shaft.

18. The confocal microscope according to claim 11,
wherein the confocal scanner further comprises:
an optical filter which filters the light reflected by the beam splitter; and a relay lens which forms an image of the light emitted from the optical filter.

19. The confocal microscope according to claim 11, wherein the confocal scanner further comprises:
a collimating lens which converts light emitted from a light source into parallel light; and
a reflection mirror which reflects the parallel light, which has been emitted from the collimating lens, toward the first disk.

20. The confocal microscope according to claim 19, wherein the collimating lens is disposed on an outward side of the first disk and the second disk in the radial direction such that an optical axis of the parallel light passes through an area between the first disk and the second disk.

* * * * *